Figure 6:
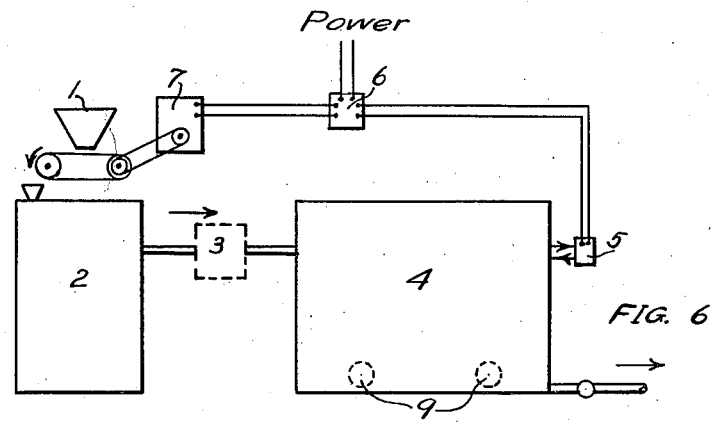

Oct. 26, 1943.    H. E. KEYES    2,332,647
PRODUCTION OF IRON SULPHATE
Filed Nov. 17, 1938    3 Sheets-Sheet 1
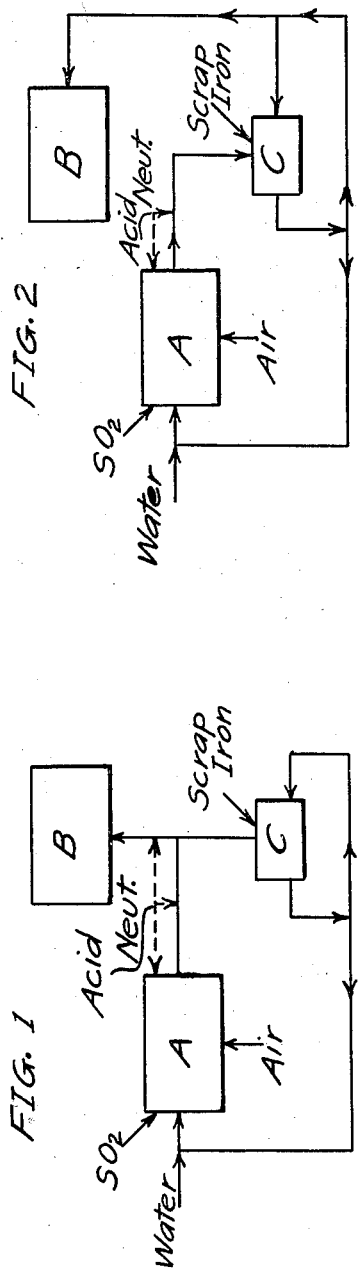
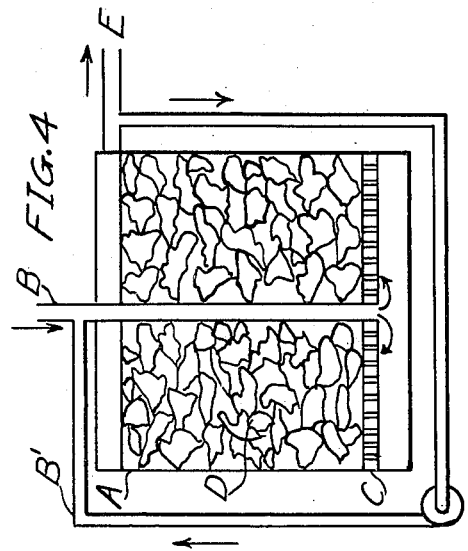
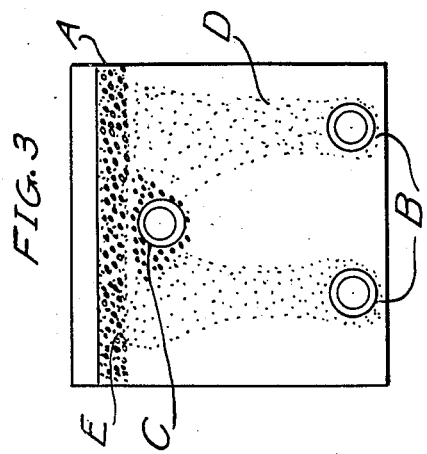
INVENTOR.
Harmon E. Keyes

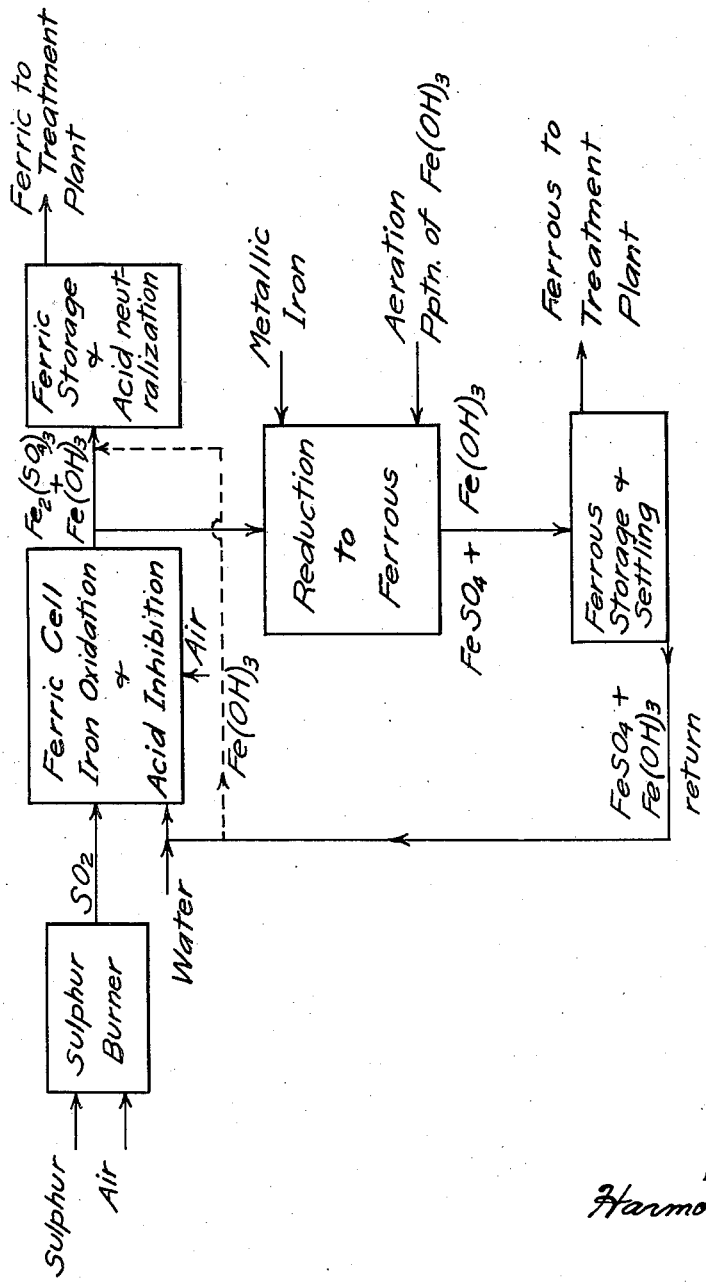

Patented Oct. 26, 1943

2,332,647

UNITED STATES PATENT OFFICE 2,332,647

PRODUCTION OF IRON SULPHATE

Harmon E. Keyes, Phoenix, Ariz.

Application November 17, 1938, Serial No. 241,023

8 Claims. (Cl. 23—126)

In the fields of water and sewage treatment the need for cheap iron salts is becoming of increasing importance. The method here described deals with the preparation and use of iron sulphate solution either in the ferrous or ferric condition, the free hydrogen ion content, as determined by the pH, being suitably controlled by the same method.

Although the chloride form of iron has been extensively used in the past, yet it has been recently recognized by those skilled in the art that the desired result is accomplished by the action of the ferrous or ferric ion regardless of the anion with which the iron is combined. The criterion for determining the form of iron most suitable is then the matter of cost. Because of this fact and also that my method affords a cheap and novel means of manufacturing said iron salts at or near the point of application this method is proposed for use in water treatment or sewage disposal. However, I do not intend to limit this method of producing iron salts to the above fields and I also propose its application to any other branch of industry having need for such salts. Specific reference to sewage is here made in order to demonstrate a definite applicability.

The raw materials used are preferably elemental sulphur and any convenient form of scrap iron, such as tin cans reclaimed from garbage and which may be shredded or incinerated before use. Sulphur dioxide may also be produced by any other means, such as roasting sulphide ore or use of sulphur bearing stack gases, or even liquid sulphur dioxide in special cases. Copper as solutions, such as are formed in iron pickling works, in copper cementation plants, or by dissolving metallic iron directly by sulphuric acid may also be used as a source of iron. A certain amount of air in conjunction with sulphur dioxide is vital to the process and is added in any convenient manner. Certain improved ways and means of introducing air and SO₂ are included with this process as a part of this invention and which are applicable to other processes employing iron sulphate or free acid. Another feature of this process is control of pH of the resulting iron solution so that the desired result is obtained when applying such solutions to their intended use. Free acid may be generated as desired or it may be inhibited during or subsequent to iron oxidation so that an acidic or essentially neutral solution of iron sulphate is produced at will.

Although a plant of given dimensions has a maximum capacity for oxidizing iron or producing acid when the solution contains approximately 10 grams iron per liter, yet I have shown that by my method of oxidation successful results are accomplished over a wide range of iron concentration, as for example, from less than 3 to more than 50 grams per liter, the acid forming tendency being simultaneously controlled or inhibited as desired.

Iron oxidation is here carried out by the so-called aut-oxidation process, by which sulphur dioxide and ferrous sulphate are simultaneously oxidized by air, and is shown by the reaction

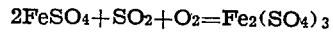
$$2FeSO_4 + SO_2 + O_2 = Fe_2(SO_4)_3$$

This manner of oxidizing iron has long been known, having been described my Emmens in U. S. Patent 543,002, filed March 29, 1894.

Acid may also be formed according to the reaction

$$2SO_2 + O_2 + 2H_2O = 2H_2SO_4$$

The acid forming reaction largely takes place after iron oxidation has become practically complete, although some acid tends to form during iron oxidation. This acid formation is dependent on presence of ferric iron, manganese or other metal salts capable of acting catalytically, and was described by Melville Clark, British Patent No. 3,669, filed March 9, 1888.

This contact with SO₂ and air is conducted in a reaction apparatus, hereinafter described as the "cell." Inasmuch as the conversion of SO₂ is more effective in hot than in cold solutions I employ conservation of heat in the reaction apparatus and also utilize a certain amount of sensible heat in the SO₂ burner gas by suitable heat interchange or by adding SO₂ gas at elevated temperatures directly to the solution. Cold iron solutions may thus be brought up to the desired temperature for the reaction with SO₂ and oxygen.

Certain means of effecting sulphur dioxide fixation to produce ferric sulphate are described in my previous patents, Nos. 1,823,831, 1,952,675, and 2,055,082, and although such means could be employed with possible advantage in this process, yet as other means of conducting this reaction are available and which are not subject to the above patents, the process here described may be conducted without regard to any specific manner of iron oxidation or cell construction provided that the above aut-oxidation method is employed. However, novel and improved means of conducting this iron oxidation, or acid forming, reaction are disclosed below as a part of this invention.

One of the features of this process by which the previously known aut-oxidation reaction may be used to produce a ferric iron solution suitable as a coagulent at the required pH is the inhibition of acid, thereby rendering it unnecessary to employ the large amounts of alkaline substance that would otherwise be necessary to neutralize the acid formed particularly when relatively strong ferrous sulphate solutions are oxidized. By thus controlling the acid forming tendency of the sulphur dioxide reaction I am able to produce ferric sulphate solution suitable for coagulating purposes. Acid inhibition during iron oxidation may be accomplished in a variety of ways. The process may employ, but is not necessarily limited to certain means of acid inhibition as are here described. The following methods of restricting acidity are given by way of example.

(1) Manganese ore, of a state of oxidation higher than manganous and preferably manganese dioxide, may suitably be employed to both oxidize the remaining ferrous iron and neutralize acidity according to the reaction $$MnO_2 + 2FeSO_4 + 2H_2SO_4 = Fe_2(SO_4)_3 + MnSO_4 + 2H_2O$$

Thus, acid is consumed and iron simultaneously oxidized. The manganese introduced into the solution as sulphate may be beneficial by acting catalytically in subsequent oxidation steps or it may assist by actual floc formation. This addition of manganese is conveniently carried out by adding manganese dioxide ore in either lump or pulverized form to the $SO_2$ cell, to the solution leaving the cell or to the portion of the solution being advanced to sewage treatment. If desired solution may be drawn from the cell or storage tank and recirculated through a bed of manganese ore. Likewise, the advancing solution to sewage may be run through the bed of manganese dioxide. If the cell reaction is carried to the point of inadvertently creating an excess of acid the reaction with manganese may be balanced by adding the requisite amount of ferrous sulphate which may be taken from the reduction circuit later to be described. When an excess of ferrous sulphate is present during the manganese oxide treatment acid may be neutralized to the point of producing basic ferric sulphate without causing iron precipitation prior to adding to the sewage.

(2) Another means of inhibiting acid production by reaction with a compound of iron is use of ferrous carbonate according to the reaction $$FeCO_3 + H_2SO_4 = FeSO_4 + H_2O + CO_2$$

By contacting the solution in the cell with iron carbonate the acid is inhibited by neutralizing as fast as formed, the ferrous sulphate thus produced being oxidized in the cell. If ferrous sulphate is desired with the ferric, as for odor control in the sewage plant together with coagulation, the ferrous carbonate treatment can be given to the advancing solution.

(3) In extreme cases the acid may be neutralized directly by lime either in the cell or subsequently, but I generally prefer to utilize a neutralizing substance that reacts with acid to produce a useful form of iron such as above described.

(4) Some of the metallic iron as is used in the dissolution circuit may be converted to ferric hydroxide and added to the cell. Thus, the solution is aerated during the reduction stage and the resulting iron hydroxide produced returned to the cell before it becomes inactive from loss of combined water. Actually, this iron hydrate compound may be complex in nature, but for sake of brevity its production may be shown by the reaction $$3O_2 + 6H_2O + 4Fe = 4Fe(OH)_3$$

If desired a separate charge of iron may be treated as above to produce a hydrate sludge which is then added to the cell circuit to inhibit acidity. Various ways of adding this sludge are shown in Fig. 5. However, if said sludge is not desired its presence may be practically avoided and loss of iron from insoluble compounds prevented by precluding air from the reduction system. This is in contradistinction to certain iron chloride processes in which considerable loss of iron results from a hydrate-type of sludge formation.

(5) Acid inhibition may be largely accomplished and without reaction with any of the above type of chemical substances by my proposed method of $SO_2$ cell operation more fully described below. Briefly, this consists of sufficiently fine subdivision of air as to produce a dense frothing action with the iron salts in the cell, by restricting the rate of $SO_2$ addition so that only a negligible concentration of free $SO_2$ exists in the solution, and furthermore stopping the reaction with $SO_2$ while a definite amount of ferrous sulphate still remains in the solution.

By simply diverting either all or only a part of the ferric solution from the cell to the reduction system the plant may be made to produce either ferrous or ferric sulphate respectively. It therefore follows that the same plant may produce both ferrous and ferric sulphate as final products in any desired proportion. If only ferric sulphate, as for coagulation, is desired and no appreciable acid is produced one third of the ferric solution from the cell is advanced from the system and the remaining two thirds circulated over metallic iron, thus reducing the ferric and increasing the dissolved iron content of the solution back to the original total value according to the reaction $$Fe_2(SO_4)_3 + Fe = 3FeSO_4$$

By then adding water to equal the volume of the solution advanced the original volume and total iron concentration conditions are restored in this solution which is returned to the $SO_2$ cell for subsequent oxidation.

In case only ferrous iron is desired, such as for control of sulphide nuisance which may be shown by the reaction $$FeSO_4 + (NH_4)_2S = FeS + (NH_4)_2SO_4$$

the entire ferric sulphate solution from the cell is passed over metallic iron to give a neutral ferrous sulphate solution. In this case the quantity of iron advanced from the system to sewage equals one half the amount oxidized at each cycle in the cell.

From the above it follows that for every pound of iron advanced in the ferric condition three pounds are oxidized to ferric in the cell, whereas, only two pounds are so oxidized per pound of iron advanced as ferrous sulphate. A point of note is that the advanced ferrous solution is 50 per cent stronger in iron than that treated in the cell, so that by producing ferric iron at 50 grams per liter it is possible to advance ferrous solutions containing at least 75 grams iron per liter. This makes possible production of a concentrated ferrous sulphate solution which can be transported from a central plant to points of application a reasonable distance away.

I have found that, whereas ferric sulphate may be reduced to ferrous in less than 30 minutes by agitation with finely divided metallic iron, such as tin scrap, yet several hours may be required for acid neutralization. If it is not convenient to supply a sufficiently fine form of iron or long enough contact time to complete the neutralization of any acid present, I may employ neutralizing methods as above described prior to treatment with metallic iron, thereby neutralizing the free acid in the entire cell effluent. The greater reaction speed of ferric sulphate as compared to free sulphuric acid in dissolving metallic iron is a feature of this process, and by thus making use of ferric sulphate in dissolution of metallic iron an improved method is established as compared to use of only sulphuric acid for this purpose.

If an exceedingly strong solution of ferrous iron is desired, for example in transporting a considerable distance, I find it expedient to operate the cell so as to continue to build up a considerable acid concentration, thereafter reacting not only the ferric iron but also the free acid with metallic iron thus building up a higher concentration of ferrous sulphate for sewage or water treatment processes than would be possible by simple reduction of the ferric iron.

In certain chemical processes for sewage treatment in which flocculation is obtained at a pH less than 7, the required acidity for the ferric sulphate solution is readily produced in my process by simple adjustment of the cell operation, such as by extending the time of contact of $SO_2$ beyond that required for iron oxidation.

When free acid is not desired in the cell solution, even if manganic oxide be not employed, I have found it possible to oxidize 98% of the iron in a solution containing 30 gms. iron per liter without forming over 1.5 gms. of free acid per liter by constructing and operating the cell in the novel manner as described below.

Although, as before stated, any convenient type of aeration cell may be employed as a step in my process, yet I am here proposing and describing a method of cell operation which I have found to be superior to former schemes in that the rate of iron oxidation and degree of $SO_2$ conversion are greatly increased and the simultaneous acid formation decreased, thus producing a solution highly satisfactory as a coagulent and at a reduced cost as compared to former methods.

The criteria for successful cell operation and to which my proposed method will conform may be stated as: Employment of gas at 10% or more of $SO_2$; gas and air vented from cell to contain 0.1 to 0.01 or less % $SO_2$; 10 to 15 pounds iron oxidized per 1 pound of acid simultaneously produced; rate of iron oxidation 6 to 12 gm. per liter per hour; strength iron solution 30-50 gm. per liter; 98 per cent oxidation of iron. I have discovered that the above results may be simultaneously accomplished under such conditions of fineness of dissemination and rate of addition of air-containing gases into the lower portions of the solution, uniformity of aeration conditions throughout the cell volume and concentration of iron in solution that a substantial bed of froth persists on top of the solution and to a depth of approximately 15-30 per cent of the height of solution. Such froth, which resembles that in a flotation cell, is indicative of the proper relation of the above factors and is a criterion for successful operating conditions to produce solutions satisfactory for this process when such froth is formed under normal operating conditions and is caused to be produced by the combination of factors as above stated. Furthermore, it may itself perform a useful function in assisting oxidation and absorption of sulphur dioxide as the $SO_2$ in being evolved from the cell must pass through this froth column. A certain variation in degree of frothing is occasioned by change in state of iron oxidation, acidity, coalescence of bubbles or presence of frothing agents, which factors do not vitally effect the cell operation although producing a noticeable effect on frothing. The type of frothing that I find indicative of efficient cell operation is not materially inhibited by any of the above conditions affecting frothing.

In the above connection I have found for example that satisfactory oxidation is obtained by using standard porous aerators of No. 5 standard porosity and which have a combined surface area approximately equal to that of the cell bottom. In a deep column uniformity of aeration may be enhanced by placing porous aerators at different depths in the solution so that fine bubbles are introduced in the upper zones of the solution to counteract the coalescing tendency of air introduced at the bottom. Uniformity of aeration is preferably secured by spacing aerators at regular intervals in the cell.

In conjunction with the above I have found that the sulphur dioxide added in correct amount may be absorbed to give a conversion of 98-99 percent without use of any baffles, channels or specially deflected solution currents and at a pressure substantially less than that employed in the aerators, by simply introducing the $SO_2$ gas into the solution slightly beneath the surface, using a perforated lead pipe or aeration diffusion tube. By such means I can secure satisfactory cell operation with a solution column several feet in depth and a pressure of $SO_2$ gas only 10-20 per cent that of the aeration air. This permits use of moderate pressure blowers of the open blade type for the sulphur dioxide gas and thus cheapens the cost of cell operation by not requiring positive pressure gas pumps or pressure type sulphur burners to force the gas under the same amount of solution head as is required for aeration. However, if desired pressure type sulphur burners may be used, thereby eliminating $SO_2$ gas compression and permitting submergence of the $SO_2$ absorber at any solution depth compatible with the air pressure used at the sulphur burner.

A distinctive feature of the method of sulphur dioxide fixation as here described is that the gas discharged from the cell is not objectionable as it may be held at less than 0.01 per cent $SO_2$ and a rate of iron oxidation as high as 10 gm. per liter per hour maintained. This is of importance in that plants may be located close to municipal districts where discharge of sulphur containing stack gases in concentrations injurious to vegetation would not be permitted.

The steps of the process are shown in the accompanying drawings, Fig. 1 being a typical flowsheet for ferric sulphate and Fig. 2 for ferrous sulphate production, A representing the $SO_2$ conversion cell, B the system to which the iron salt is finally added and C the scrap iron reduction tanks.

Although the drawings here given show the process operating on a continuous basis, yet the batch system for either the oxidation or reduction phase may be employed without deviating in any way from the spirit of this invention. For continuous operation of the oxidation cell a steady flow of solution is maintained with a definite relation between the quantity of iron oxidized and SO₂ converted, using a cell preferably of minimum size to afford the required contact time. In batch operation the cell mechanism is preferably installed in a tank of relatively large dimensions so as to accommodate all the solution produced in a given period of operation, as for one to 3 shifts, and the SO₂ is shut off when the desired amount of contact with the solution has been obtained. Both batch and continuous type operation have advantages peculiar to a given scale of operation or set of conditions. In general, for a relatively small scale operation or with fluctuating conditions of gas or solution flow the batch system is preferable, while under steady conditions and large scale operation the continuous method gives cheaper operation. Obviously, for batch operation using a sufficiently large cell to also function as a ferric solution storage tank the degree of aeration in the tank for effective conversion of SO₂ is much less than in case of a tank of minimum required size, so that the aerator surface is also less in proportion to the size of the tank. This gives a less degress of frothing, but, in general the same principles as to fine air subdivision apply though not to as large an extent, as in the case with the continuously operating cell.

The above described method of cell operation is illustrated in Fig. 3, A showing a tank of any convenient size or shape; B porous aerators of cylindrical or flat design; C an absorber tube for dispersing SO₂ containing gas into the solution and which may be a pipe perforated so as to handle a dusty gas as from sulphide ore roasting, or a porous diffuser tube in case the gas is relatively clean; D is the solution and E the bed of froth indicating proper subdivision of air and rate of aeration to effect the desired rate of conversion. By this type of cell SO₂ conversion efficiencies of 99 per cent or higher may be obtained coincident with an oxidation rate of approximately 10 grams iron per liter per hour and oxidation of iron to the point at which not over 0.1 gram ferrous iron remains without forming an objectionable amount of acid.

Metallic iron or scrape in any suitable form may be used in the reduction stage. This I prefer to accomplish in a device shown in Fig. 4 in which A is a tank, B an inlet pipe for ferric solution, C a perforated bottom holding the iron charge D, and E the discharge for advancing effluents. Recirculation of solution to provide additional contact with iron may be accomplished by any suitable pump or air lift, as shown by G. The solution may be thus recirculated, it may be agitated with air to effect contact and produce ferric hydrate if desired, or the solution may be continuously advanced through a series of reducing tanks, thereby avoiding aeration conditions or necessity of circulating pumps.

One method of conducting my process is shown in Fig. 5. Here both ferric and ferrous sulphate are produced in the same plant for distribution. This flowsheet also illustrates the employment of ferric hydroxide (or hydrated oxide) to inhibit acid formation.

Inasmuch as the method here described constitutes a complete process with all necessary steps for production of ferric and/or ferrous sulphate, any mode of cell operation or construction may be adopted without deviating from this process in its essential features.

In actual operation, the products of my process are applied in any convenient manner. According to standard practice for sewage treatment the pH of the ferric solution is adjusted as above described to suit the individual needs. If coagulation is desired by the action of hydrolysis

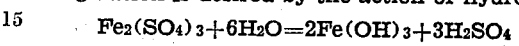

the precipitation may be facilitated by adding a base, such as lime, to the sewage before treatment. By decreasing the pH of the ferric sulphate as provided by the control features of my process a delayed action in floc formation may be secured if desired. I have also found that the acid in strong ferric sulphate solutions may be neutralized, as by my method of employing manganese dioxide, to the point of net basicity as shown by standard method of free acid determination, without causing precipitation of iron until dilution, thus lowering lime requirements.

The ferrous sulphate solution made as above described can be used in certain instances for water treatment when oxidation by natural means is feasible. The floc is then formed following oxidation of the ferrous iron by the dissolved oxygen in the water.

A further advantage of my method where use of appreciable acid is required is that such acid may be generated at will in the cell and the objectionable and dangerous handling of concentrated acid is entirely eliminated.

It is distinctly understood that in applying the ferric sulphate, as produced by my process, to sewage treatment I am not confined to any particular sewage treatment process or manner of addition of iron salts. Inasmuch as use of iron salts is generally recognized I propose the use of iron sulphate as produced by the method here described, in any stage of the sewage treatment to which such salts are applicable, for example, either in straight chemical precipitation or as an adjunct to activated sludge.

It is further understood that the mode of cell operation as here described may be extended to produce free acid as desired in either acid sewage floc formation or for industrial or metallurgical purposes. For such use the iron concentration may be as low as 2 or 3 gms. per liter, or in special cases other catalysts, such as manganese, could be employed. In such application I do not confine myself to any special catalyst or concentration thereof, but abide by the above described condition of cell operation by which the degree of aeration together with requisite fineness of air subdivision are evidenced by a copious and persistent frothing, which condition increases the rate of acid formation to a degree not heretofore obtained on a commercial scale.

Due to the sharp division point between the end of the iron oxidation and beginning of the acid forming stage when my proposed method of cell operation is employed it is my purpose to provide means of control to definitely stop the SO₂-solution contact before the acid forming reaction takes place to any appreciable extent, when such acid is not desired. This can be done when the iron is 98 per cent oxidized and the free acid not over 2 gm. per liter and without use of acid inhibiting chemicals.

In the adaptation of my process to situations in which automatic control is desirable, as for example in the smaller municipal districts not having constant attendance at the sewage or water treatment plants, I propose as an adjunct to this process certain control features by which the $SO_2$ and iron relations are so controlled that the degree of iron oxidation and corresponding acidity in the solution are maintained at a predetermined figure. As has been previously shown, it is important in ferric sulphate production for coagulating purposes to closely regulate pH conditions so that the resulting solution will function satisfactorily. Although this may be accomplished by manual control of the $SO_2$ cell, yet it is my purpose to make this automatic insofar as is feasible for a given installation.

It is not within the scope of this invention to prescribe the definite mechanical devices by which this control is accomplished, but rather to disclose the basic concept of utilizing certain functions in changes of state of oxidation or of pH such as conductivity or electrical potential of the solution. By employment of available means of measuring or indicating such functional changes in the solution, and with suitable relay and amplification devices I propose to electrically actuate the mechanism controlling the rate of sulphur feed, the iron solution flow through the cell or the rate of addition of acid inhibiting agents which last may be applied directly to the cell or to the solution following the cell circuit. A simpler installation may consist of signal or alarm devices by which the operator is warned of variation from a predetermined figure. In the above connection use of the "electric eye" may assist in actuating the necessary mechanism to effect the desired control.

Figure 7:
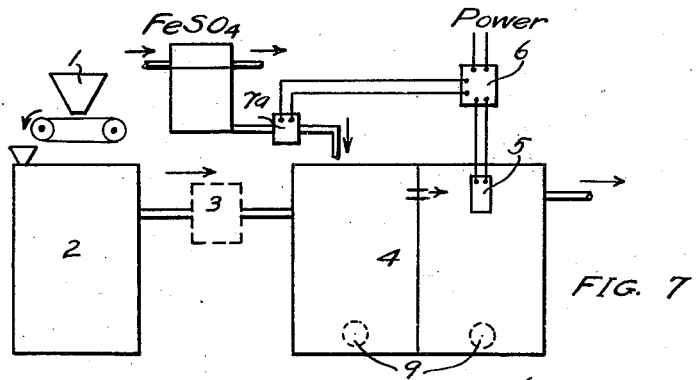
Figure 8:
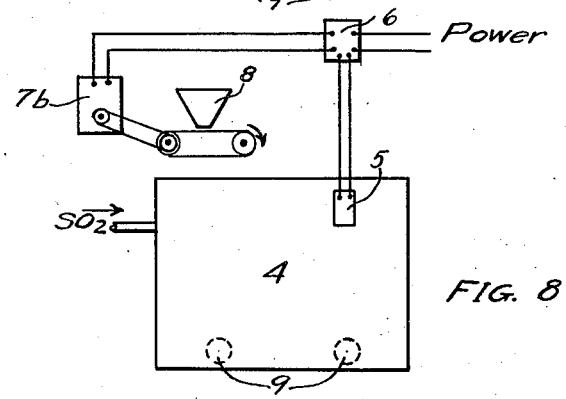

Typical examples illustrating my control method to aid in effecting oxidation without producing appreciable free acid are shown in Figs. 6, 7 and 8, in which 1 represents the sulphur feed mechanism, 2 the sulphur burner, 3 the optional blower for use if the sulphur burner is not operating under sufficient pressure to contact the gas with the solution, 4 the $SO_2$ conversion cell, 5 a device either immersed in the cell solution or connected externally with the cell solution and by which concentration conditions in the solution produce electrical changes which in turn actuate, as by the "electric eye" or other suitable devices, an electric relay as shown by 6 which furnishes current from the power line to actuate the feed control mechanism 7, 7a and 7b, respectively.

Figure 6 represents a batch operation, Fig. 7 a continuously operating cell and Fig. 8 either a batch or continuous cell in which acid inhibiting substance, such as manganese ore or ferrous carbonate is added and controlled by the mechanism shown at 8, Fig. 8. Instead of actually controlling the various feed devices the apparatus may be simplified by using the electric circuit to give a signal or record the cell condition, the actual control of the various feed devices being then conducted manually. In each case 9 represents the porous aerators.

I have found that by extremely fine air subdivision and adequate degree of aeration, as evidenced by copious frothing as above described, that although the permissible rate of iron oxidation without forming acid is greatly increased, yet due to the space occupied by the resulting froth the capacity of the cell is correspondingly reduced. I therefore propose to use in cases requiring maximum output from a cell of given size, certain means to minimize frothing such as a circulating solution spray. Also, any chemical agent tending to inhibit frothing would be applicable for this purpose.

The requisite conditions for producing ferric sulphate for use as coagulent in alkaline or neutral circuit may be summarized as follows:

1. Extremely fine air subdivision for oxidation.
2. Adequate degree of aeration to produce copious frothing under normal conditions.
3. Avoidance of excessive dissolved $SO_2$ in the cell solution by control of $SO_2$ addition rate so that air evolved from the cell generally contains less than 0.1 per cent $SO_2$ by volume.
4. Addition of acid inhibitors if conditions 1–3 above do not produce the desired minimum of acid.
5. Stopping $SO_2$ reaction in cell at point of desired degree of iron oxidation and before objectionable acid is formed.

By use of the automatic control features as shown in Figs. 6, 7 and 8, or even by manual control, my method of ferric sulphate production may be applied to systems requiring a definite and predetermined pH, over the entire range from neutrality to an acidity of 100 gm. free sulphuric acid per liter. This is of importance in sewage treatment processes employing flocculation in acid circuit, as the acidity is generally required to be maintained constant within close limits.

*Examples*

A typical pilot plant installation and results obtained therein are described by way of example. The $SO_2$ cell held 154 gal. of solution, with a column height of 4½ feet. The solution added to the cell contained 32.85 gm. per liter ferrous and 33.8 total iron, the free acid being 0.29 gm. per liter. Air was added at the rate of 15.2 cu. ft. per minute free air at a pressure of 3.05 lbs. per sq. in., the air addition being through two No. 5 standard porosity aerator tubes set at the bottom of the tank. Satisfactory aeration is obtained by any standard aerator giving air bubbles approximately 1 millimeter, or less, in diameter. This is conveniently accomplished by the previously mentioned Standard alundum plate or tube aerator known as No. 5 porosity, specifications of which are given in catalog of the Carborundum Company. The Figure 5 denotes a given fineness of pores which provides the requisite degree of air dissemination with a corresponding low resistance compatible with economical power consumption. The gas introduced to the cell contained 16.7 per cent $SO_2$ and was added through a perforated lead pipe set above the aerators and with a submergence of 16 inches of solution, thus giving a pressure on the $SO_2$ system of 0.80 lb. per sq. in. The air and gas discharges from the cell contained 0.011 per cent $SO_2$ during the entire run, the conversion of $SO_2$ being 99.7 per cent. The ratio of oxygen in the aeration air to $SO_2$ was 4.16 during the run which lasted 3.42 hours. At the end of the run the solution contained 33.3 gm. per liter ferric iron, 0.13 ferrous and 1.88 gm. per liter free acid, no chemical acid inhibitor being used. The solution temperature rose from 29 to 56° C. Approximately 50 gal. of solution was thus available for advance to sewage treatment, the solution balance being maintained by sending 100 gal. to the reduction system where by contact with shredded tin cans reduction was 96.3 per cent complete in 1.42 hours, the reduced solution assaying 48.7 gm. per liter ferrous iron, 50.65 total iron and 0.58 free sulphuric acid. After 4 hours contact the reduction was 99.8 per cent complete. Air was blown into the reduction system and effected a certain amount of ferric hydrate precipitation which functioned in the next cycle to inhibit to some extent free acid formation. For the next oxidation cycle water was added in such proportion as to produce the original iron strength and solution volume.

Similar runs were made in the same plant, but employing manganese dioxide in the $SO_2$ cell circuit to inhibit acid formation. This was done by circulating a small volume from the cell over a bed of manganese ore during the oxidation period. In a typical run the solution initially contained 28.4 gm. per liter ferrous iron, 28.9 total iron and 0.4 free acid. The oxidation stage required 2.75 hours, the ratio of oxygen to $SO_2$ being 2.33. At the end of the oxidation period the ferric iron was 27.3 gm. per liter, and the solution according to assay was basic, so that by adding and then deducting a definite amount of free acid to the assay, the net free sulphuric acid in the solution was found to be minus 0.61 gm. per liter which is quite within reason when it is considered that colloidal ferric hydroxide was kept in solution by the conditions that obtained. This solution was stable, as no precipitation of iron occurred in a sample that stood for more than a month.

In the above examples the froth column stood to a depth of 15 inches over the solution during the entire oxidation period, the amount of such froth, which varied with the degree of aeration, thus limiting the quantity of aeration air to the value shown. By way of comparison another run was made employing a perforated lead pipe aerator and cascade type absorption. Solution volumes and iron strengths were similar to the above. However, the amount of aeration air required to produce this result gave a ratio of 51.5, as compared to 4.16 in the first example above and 2.33 in the second, the air requirement in the last instance thus being 12.4 and 22.1 times, respectively, as great as in the first two cases that employed fine aeration. Furthermore, in the last instance the $SO_2$ conversion was only 87.0 per cent, persistent frothing being absent.

To illustrate ability to oxidize very strong iron solutions a run was made under similar fine aeration conditions with a solution containing initially 53.0 gm. per liter ferrous and 54.3 total iron. In 8.45 hours oxidation treatment the ferric iron was 52.9 gm. per liter, the acid production being 3.5 gm. per liter. The ratio of oxygen to $SO_2$ added was 6.04. The ratio of pounds iron oxidized to pounds acid produced was 14.7, no acid inhibiting chemicals being used in this case.

It is understood that ferrous sulphate for use in my process could be obtained by treating metallic iron with commercial sulphuric acid, in which case recirculation of the cell solution to dissolve iron would not be required. However, as formerly pointed out I prefer to employ the ferric sulphate reduction step for iron dissolution, due to greater reaction speed and freedom from the nuisance of handling concentrated acid.

It is furthermore understood that the various features of this process may be carried out in different manners and applied over a wide range of conditions without departing from the spirit of this invention, and that I am only bound by the limitations as imposed by the following claims.

I claim:

1. The process of producing ferric sulphate consisting of contacting ferrous sulphate solution with $SO_2$ and air in a reaction chamber, diverting a portion of the ferric solution and contacting with metallic iron, adding air to the solution in contact with metallic iron to thereby produce a suspension of hydrated iron oxide, adding said hydrated form of iron together with ferrous sulphate solution produced by above metallic iron contact to the $SO_2$ air reaction chamber and reacting the hydrated form of iron to neutralize free acid formed by the $SO_2$ contact.

2. A method of oxidizing $SO_2$ to sulphate form which consists of contacting elemental sulphur and an excess of air under superatmospheric pressure said pressure being sufficient to overcome pressure resulting from the introduction of the gas into a solution body, burning said sulphur to sulphur dioxide, coarsely dispersing the resulting products of combustion beneath the surface of a body of an iron-containing solution and simultaneously and separately introducing finely disseminated air into said body of solution.

3. A method of producing ferric sulphate comprising establishing a body of ferrous sulphate solution, separately and simultaneously introducing a mixture of gases containing $SO_2$ and finely divided air into the solution said mixture of gases containing $SO_2$ being introduced directly into the zone of fine air dispersion in the solution; and utilizing the air so introduced to agitate the entire body of solution to produce a homogeneous solution to assure a homogeneous condition of the solution body with respect to dissolved gases and metal salts, limiting the rate of introduction of $SO_2$ and adding such excess of air to maintain a preferential oxidizing action on iron sulphate, and neutralizing free acid in the solution prior to completion of iron oxidation.

4. In a process for converting sulphur dioxide to a sulphate radical in the form of ferric sulphate, the steps that include introducing air in relatively finely divided form into a body of an aqueous solution of ferrous sulphate that acts in the presence of air to promote conversion of sulphur dioxide to a sulphate radical, in order to produce a mixture containing minute air bubbles dispersed in said solution; separately and simultaneously introducing into said mixture in dispersed form a gas containing sulphur dioxide to produce ferric sulphate in the solution; and controlling the acidity of the solution during reaction by limiting introduction of sulphur dioxide to a rate preventing formation of a substantial concentration of free acid and stopping introduction of sulphur dioxide when oxidation of the iron is substantially complete.

5. In a process for making ferric sulphate, the steps that include treating an acid ferrous sulphate solution to neutralize substantially all free acid; introducing air in relatively finely divided form into the solution to produce a mixture containing minute air bubbles dispersed in said solution; separately and simultaneously introducing into said mixture in dispersed form a gas containing sulphur dioxide to produce ferric sulphate in the solution; and controlling the acidity of the solution during reaction by limiting introduction of sulphur dioxide to a rate preventing formation of a substantial concentration of free acid and stopping introduction of sulphur dioxide when oxidation of the iron is substantially complete.

6. In a cyclic process for converting sulphur dioxide to a sulphate radical in the form of ferric sulphate, the steps that include introducing air in relatively finely divided form into a body of an aqueous solution of ferrous sulphate that acts in the presence of air to promote conversion of sulphur dioxide to a sulphate radical, in order to produce a mixture containing minute air bubbles dispersed in said solution; separately and simultaneously introducing into said mixture in dispersed form a mixture of gases containing sulphur dioxide to produce ferric sulphate in the solution; bringing solution containing ferric sulphate into contact with metallic iron to reduce the ferric sulphate to ferrous sulphate and neutralize free acid; returning the reduced solution to the original ferrous sulphate solution; and withdrawing solution from the cycle and replacing it with make-up water.

7. A method of oxidizing $SO_2$ to form sulphate comprising establishing a body of a solution containing a dissolved metal salt of a type capable of acting catalytically to induce the oxidation of $SO_2$ to sulphate from the group consisting of the salts of iron and manganese, introducing air in a finely divided condition near the bottom of said solution to thereby form air bubbles in said solution and introducing into said solution near the top of the solution but adjacent said air bubbles, a gas containing $SO_2$ in a state of relatively coarse dispersion.

8. In a process for producing ferric sulphate without formation of appreciable free acid, the steps that include introducing air in relatively finely divided form into a body of an aqueous solution of ferrous sulphate that acts in the presence of air to promote conversion of sulphur dioxide to ferric sulphate in order to produce a solution homogeneous with respect to dissolved constituents and containing minute air bubbles dispersed in said solution; separately and simultaneously introducing into said solution a mixture of gases containing sulphur dioxide, and preventing formation of appreciable free acid by limiting the rate of sulphur dioxide introduction to that amount which will combine to only oxidize iron, and stopping said sulphur dioxide addition as soon as the iron is substantially oxidized.

HARMON E. KEYES.

Patent No. 2,332,647                                  Granted October 26, 1943

HARMON E. KEYES

The above entitled patent was extended October 2, 1951, under the provisions of the Act of June 30, 1950, for 2 years and 168 days from the expiration of the original term thereof.

*Commissioner of Patents.*